United States Patent [19]
Nishishita et al.

[11] Patent Number: 5,407,116
[45] Date of Patent: Apr. 18, 1995

[54] METHOD AND APPARATUS FOR CUTTING FLAT TUBES

[75] Inventors: Kunihiko Nishishita; Takashi Sugita, both of Saitama, Japan

[73] Assignee: Zexel Corporation, Tokyo, Japan

[21] Appl. No.: 35,239

[22] Filed: Mar. 23, 1993

Related U.S. Application Data

[63] Continuation of Ser. No. 797,768, Nov. 1, 1991, abandoned, which is a continuation-in-part of Ser. No. 591,276, Oct. 2, 1990, abandoned.

[30] Foreign Application Priority Data

Oct. 4, 1989 [JP] Japan .................. 1-259631

[51] Int. Cl.⁶ ............................................ B23D 21/00
[52] U.S. Cl. ................................. 225/2; 225/96.5; 225/101
[58] Field of Search ............... 225/96.5, 2, 101; 29/890.053, 413; 72/131, 183, 203

[56] References Cited

U.S. PATENT DOCUMENTS

| | | | |
|---|---|---|---|
| 1,366,063 | 1/1921 | Culhane, Jr. | |
| 3,052,975 | 9/1962 | Walters et al. | 29/413 |
| 3,112,559 | 12/1963 | Pauls | 29/157.3 |
| 3,254,400 | 6/1966 | Gordon | 29/413 |
| 3,268,137 | 8/1966 | Martin | 225/2 |
| 3,568,488 | 3/1971 | Franks | 72/68 |
| 3,679,109 | 7/1972 | King, Jr. | 225/2 |
| 3,692,219 | 9/1972 | Franks | 225/2 |
| 3,730,411 | 5/1973 | Brockmuller | 225/100 |
| 3,747,456 | 7/1973 | Kochinashvili et al. | 83/404 |
| 3,757,627 | 9/1973 | Lange | 83/558 |
| 3,866,449 | 2/1975 | Wakabayashi et al. | 72/70 |
| 3,877,625 | 4/1975 | Brock | 225/2 |
| 4,111,346 | 9/1978 | Bertolette | 225/96.5 |
| 4,216,004 | 8/1980 | Brehm et al. | 65/2 |
| 4,226,352 | 10/1980 | Watson | 225/100 |
| 4,552,291 | 11/1985 | Schott | 225/96.5 |
| 4,910,991 | 3/1990 | Bertolette et al. | 72/370 |
| 5,133,492 | 7/1992 | Wohrstein et al. | 225/2 |
| 5,143,268 | 9/1992 | Stroup, Jr. | 225/2 |

FOREIGN PATENT DOCUMENTS

| | | | |
|---|---|---|---|
| 1752448 | 3/1978 | Germany | 225/105 |
| 54-132883 | 10/1979 | Japan . | |
| 2-198798 | 8/1990 | Japan | 225/2 |

*Primary Examiner*—Rinaldi I. Rada
*Attorney, Agent, or Firm*—Sughrue, Mion, Zinn, Macpeak & Seas

[57] ABSTRACT

A method of cutting a flat tube (6) into unit pieces, which includes moving in a transverse direction rotatable disc cutters (12) with knife edges so as to cut the upper and lower walls of a flat tube to form a pair of cutting grooves (15) and fixing the flat tube at a point upstream of the cutting groove while flexing in the vertical direction a length of the flat tube downstream of the cutting grooves to break it off at the cutting grooves, thereby providing a unit piece of a predetermined length.

60 Claims, 3 Drawing Sheets

METHOD AND APPARATUS FOR CUTTING FLAT TUBES

CROSS-REFERENCE TO RELATED APPLICATIONS

This is a continuation of application Ser. No. 07/797,768, filed Nov. 1, 1991, which is a continuation-in-part application of application Ser. No. 07/591,276, filed Oct. 2, 1990, both abandoned.

BACKGROUND OF THE INVENTION

1. Field of the Invention

The present invention relates generally to methods of manufacturing heat exchanger tubes and, more particularly, to a method of cutting flat tubes into unit pieces for heat exchanger.

2. Description of the Prior Art

Flat tubes of a heat exchanger of the parallel flow type, for example, have one or more refrigerant passages therein. Such flat tubes are made by forming by extrusion a continuous tube and then cutting it into unit pieces with a tube cutter which is provided on a conveyor line. The height and the width of the continuous tube are adjusted either before or after the cutting step.

The conventional cutting techniques include (1) a metal cutting process; (2) a press cutting process; (3) a laser cutting process; and (4) a process which includes forming circumferential grooves on the continuous tube with a rotary cutter and applying a tension to the continuous tube to break it into unit pieces at the circumferential grooves. See Japanese Patent Application Kokai No. 63-264218.

In the metal cutting process, not only chips or sawdust is produced but also undesirable burrs are formed on the cut surface. As a result, a considerable number of refrigerant passages in the unit pieces are choked with the sawdust and/or closed by the burrs. For this reason, the metal cutting process requires an additional burring step, resulting in the increased unit manufacturing cost.

In the press cutting process, the cut plane of a unit piece is susceptible to deformation due to collapse of the refrigerant passage under the press action. Also, it is often that burrs are formed on the cut plane. For these reasons, this process requires not only a burring step but also a passage expansion step, resulting in the increased unit manufacturing cost.

The laser cutting process relies on the thermally fusing action of laser for cutting a continuous tube so that part of the fused material deposits on the cut surface of a unit piece. For this reason, a step of removing such deposits is required, increasing the unit manufacturing cost.

The last process mentioned above which includes forming cutting grooves on the continuous tube with a rotary cutter and applying a tension to the continuous tube pull it into unit pieces at the cutting grooves, has a disadvantage particularly for flat tubes into which the cutter blade tends to cut through, forming burrs and choking some of the refrigerant passages as in the press cutting process. In addition, the continuous tube is pulled into unit pieces by the rollers in the direction of travel of the tube so that the cut planes have rough surfaces, requiring an additional finishing step, resulting in the increased unit manufacturing cost.

SUMMARY OF THE INVENTION

Accordingly, it is an object of the invention to provide a method of cutting flat tubes into unit pieces, which requires no such a step as removal of the sawdust, burrs, or fuse deposits, or expansion or cleaning of the cut ends, thus reducing the unit manufacturing cost.

In accordance with the invention there is provided a method of manufacturing a heat exchanger tube by cutting a flat continuous tube having a refrigerant passage premolded by extrusion into unit pieces each having a predetermined length, the method including the steps of moving rotatable disc cutters with knife edges so as to cut transversely the upper and lower walls of the flat tube to form upper and lower cutting grooves; and fixing the flat tube at a point upstream of the cutting grooves while flexing a length of the flat tube downstream of the cutting grooves to break it off at the cutting grooves, thereby providing a unit piece of the flat tube.

By the above method, a pair of cutting grooves are formed on the upper and lower walls with a pair of rotating disc cutters. Then, a length of the flat tube downstream of the cutting grooves is flexed at the cutting grooves in the vertical direction to break it off as a unit piece having a predetermined length.

DESCRIPTION OF THE PREFERRED EMBODIMENT

Figure 1:
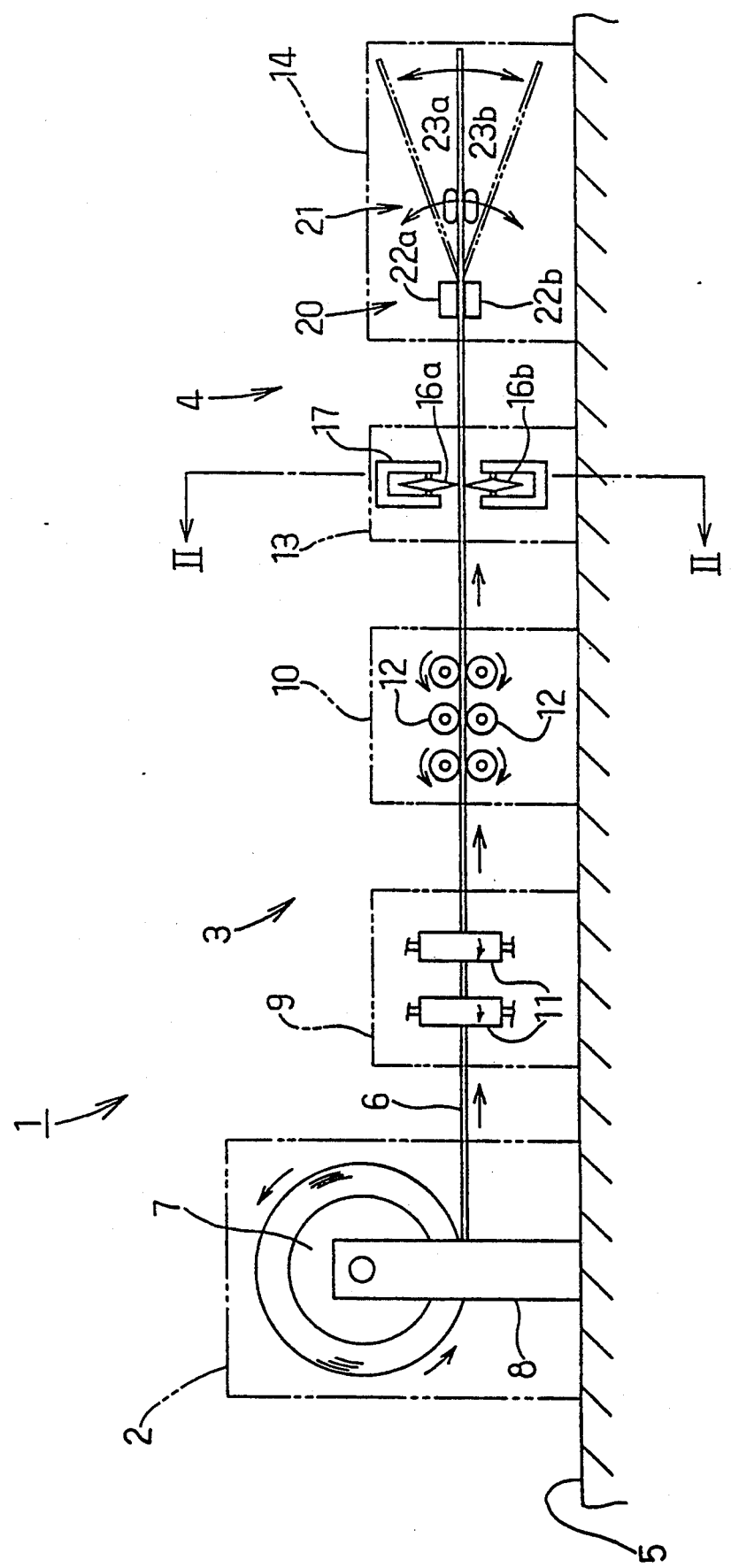
FIG. 1 is a schematic side view of an apparatus for manufacturing a heat exchanger flat tube useful for carrying out a method of the invention.

In FIG. 1, the apparatus I for manufacturing heat exchanger flat tubes includes a continuous tube feed station 2; a tube shaping station 3; and a tube separating station 4, all of which are placed in a line on a floor 5. A continuous tube 6 having refrigerant passages therein is continuously fed from the feed station 2 in one direction along which the shaping station 3 and the separation station 4 are placed.

Figure 2:
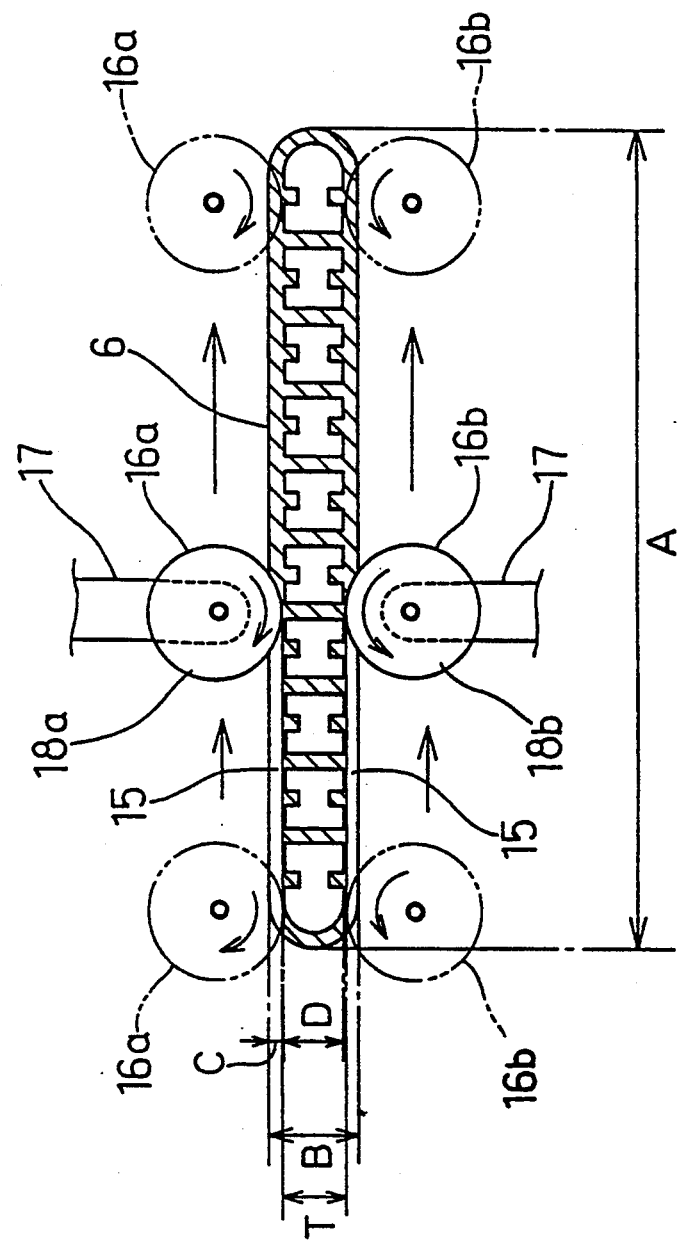
FIG. 2 is a cross sectional view of a groove forming section of the apparatus of FIG. 1.

As FIG. 2 shows, the continuous flat tube 6 has a substantially elliptical cross section having a width A and a height B and a plurality of refrigerant passages defined by partitions along the length.

The feed station 2 includes a cylindrical drum 7 around which the continuous tube 6 is wound and a drum support 8 for supporting the drum 7 for rotation.

The shaping station 3 placed downstream of the feed station 2 includes a vertical correction section 9 which consists of pairs of vertical rollers 11 disposed so as to contact the continuous tube 6 on opposite sides and a horizontal correction section 10 which consists of pairs of horizontal rollers 12 disposed so as to contact the continuous tube 6 on the upper and lower surfaces.

After having been shaped to have a predetermined width A in the vertical correction section 9, the continuous tube 6 is shaped in the horizontal correction section 10 so as to have a predetermined height B, thereby correcting any curl, distortion and/or the like which has been caused by winding of the continuous tube around the drum, thus providing a straightened continuous tube. In this embodiment, the horizontal correction section follows the vertical correction section, but these sections may be placed in the reverse order. Also, it is possible to place these sections downstream of the separation station 4.

The separation station 4 placed downstream of the shaping station 3 includes a groove forming section 13 and a tube breaking section 14.

The groove forming section 13 includes a pair of disc cutters 16a and 16b for forming upper and lower cutting grooves 15 on the upper and lower surfaces of the continuous tube 6 and a disc cutter support 17 for supporting the disc cutters 16a and 16b for rotation.

As FIG. 2 shows, each of the disc cutters 16a and 16b has an identical cutting disc provided with cutting edge 18a or 18b and supported with some play by the support 17 such that the cutting discs 16a and 16b rotate in a common plane. The distance T between the cutting edges 18a and 18b is adjusted according to the height B and the wall thickness C of a continuous tube 6. In this embodiment, the cutting distance T is set substantially equal to the distance (B-2C) so that all of the upper and lower walls are cut UP. It is noted, however, that the cutting distance T may be adjusted to satisfy a relational expression $D < T < B$ where D is the inside minor diameter between inside surfaces of the upper and lower walls of a continuous tube 6. The cutter support 17 is made movable in a direction in parallel to the floor 5 and in traverse to the feed direction of a continuous tube 6.

Figure 3:
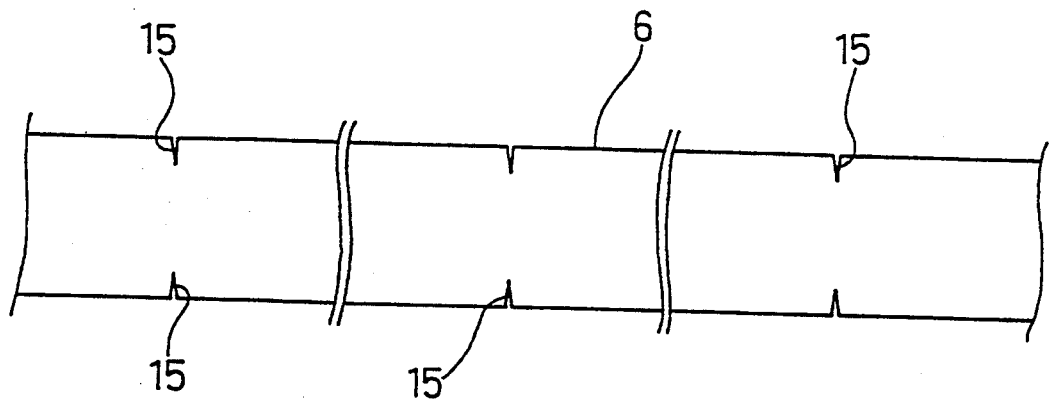
FIG. 3 is a side elevational view a continuous tube provided with cutting grooves by a method of the invention.

As FIG. 3 shows, the cutting grooves 15 of a predetermined depth are formed on the upper and lower walls of a continuous tube 6 at predetermined intervals by moving the cutter support 17 in a direction traverse to the feed direction of the continuous tube 6 so that the rotating cutter discs 16a and 16b intersect the continuous tube 6. With such an arrangement, the rotating discs cut into the walls, forming a pair of cutting grooves which are free from chips and burrs. Thus, removal of chips and/or burrs is made unnecessary. In addition, with this arrangement, expansion of passages at the cut ends is also unnecessary. In this embodiment, the feed of a continuous tube is stopped temporarily during the formation of cutting grooves.

The tube breaking section 14 includes a fixing subsection 20 and a swinging subsection 21. The fixing subsection 20 includes a pair of clamping members 22a and 22b for clamping the continuous tube 6 at a position upstream of the cutting grooves 15. The swinging subsection 21 placed downstream of the fixing subsection 20 includes a pair of clamping members 23a and 23b for clamping the continuous tube 6 at a position downstream of the cutting grooves 15.

Figure 4:
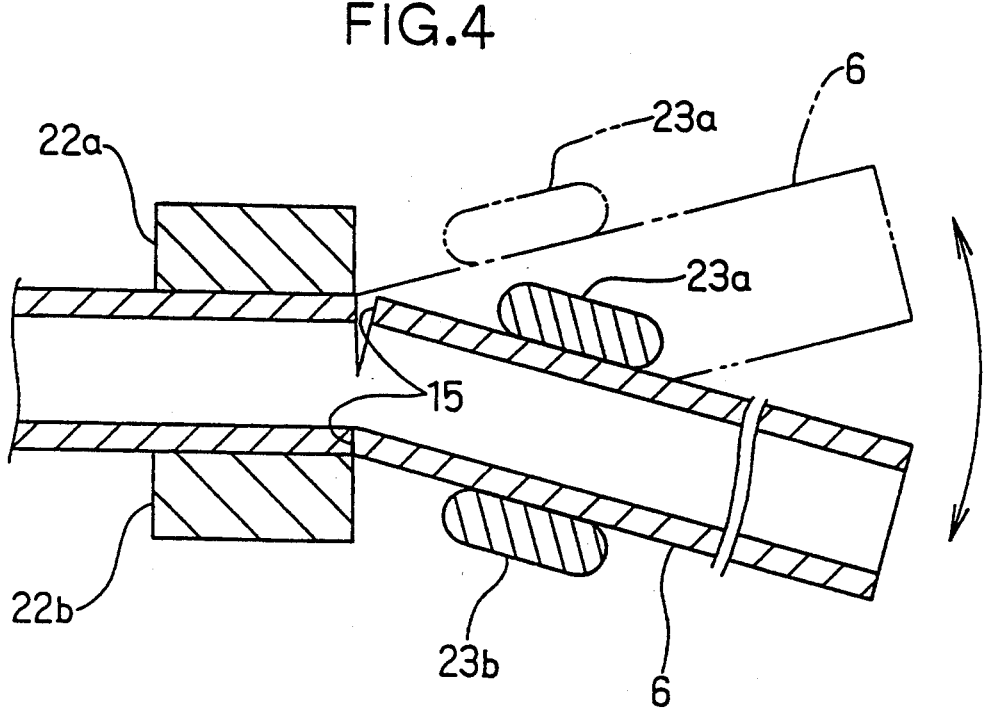
FIG. 4 is a longitudinal section of a swinging station of the apparatus of FIG. 1.

As FIG. 4 shows, the clamping members 23a and 23b are flexed once upwardly or downwardly, or swung at the cutting grooves 5 as indicated by an arrow. As a result, the continuous tube 6 is broken at the cutting grooves 15, providing a unit piece of the predetermined length. Since the cutting grooves extend substantially through the wall thickness, it is easy to break off the unit piece from the remainder. In contrast to the prior methods, no refrigerant passage is choked with chips or closed by burrs. In other words, the unit piece has neatly cut ends. In this embodiment, the feed of a continuous tube 6 is stopped temporarily in the tube breaking section 14.

After subjected to various steps such as washing, blowing, and drying, a number of unit pieces are assembled and brazed into a heat exchanger unit. According to the invention it is possible to eliminate the steps of reshaping the passage openings and the end surfaces of a unit piece, thereby reducing the unit manufacturing cost and increasing the productivity.

While a pair of disc cutters 16a and 16b are used in the above embodiment, it is possible to use two or more pairs of disc cutters, the cutting distance T of which is decreased stepwise or which are arranged in a zigzag fashion. The feed of a continuous tube is stopped temporarily during movement of the disc cutters across the continuous tube, gripping the continuous tube on the both sides across the cutting grooves, and vertical swinging of the unit piece portion downstream of the cutting grooves, but it is possible to perform a series of process steps including the groove formation without stopping the tube feed by synchronizing the respective steps.

We claim:

1. A method of cutting a flat metal tube into unit pieces, which comprises the steps of:
   feeding in a first direction a flat metal tube with a substantially elliptical cross section having an upper wall, a lower wall, and opposite side walls, said flat metal tube having a plurality of passages therein;
   moving a pair of disc cutters in a second direction parallel to said upper and lower walls and transversely of said flat tube to form a pair of cutting grooves on said upper and lower walls, with at least said side walls being left uncut;
   fixing said flat metal tube at a position upstream of said cutting grooves; and
   flexing at least once downwardly or upwardly an end portion of said flat metal tube downstream of said cutting grooves so as to break off said end portion at said cutting grooves;
   said cutting grooves having a distance T between them that satisfies the following relational expression:

$$D < T < B$$

wherein B and D are a height and an inside minor diameter of said flat metal tube so that part of said upper and lower walls remains uncut, thereby preventing not only production of any cutting burrs but also sawdust clogging and collapse of said passage.

2. A method of cutting a flat multiport tube into unit pieces, which comprises the steps of:
   feeding in a first direction a flat multiport tube having an upper wall, a lower wall, and side walls,
   moving a pair of disc cutters in a second direction perpendicular to said first direction to form a pair of cutting grooves on said upper and lower walls,
   fixing said flat multiport tube at a position upstream of said cutting grooves; and
   moving an end portion of said flat multiport tube downstream of said cutting grooves relative to said fixed flat multiport tube so as to break off said end portion at said cutting grooves;
   said cutting grooves having a distance T between them that satisfies the following relational expression:

$$D < T < B$$

wherein B and D are a height and an inside minor diameter of said flat metal tube so that part of said upper and lower walls remains uncut, thereby preventing not only production of any cutting burrs but also sawdust clogging and collapse of said passage.

3. The method of claim 2, which further comprises, after said feeding step, a step of shaping said flat multiport tube so as to provide said flat multiport tube with predetermined width and height.

4. A method of separating a thin-walled, multiport extrusion into sections of a micro-tube suitable for use as pass portions in a heat exchanger assembly, said extrusion having an upper wall and a lower wall, said method comprising the steps of:

providing a groove in said upper wall of said extrusion to a depth less than the thickness of said upper wall, providing a groove in said lower wall of said extrusion to a depth less than the thickness of said lower wall of said extrusion, said grooves in said upper and lower walls being aligned and extending transversely of said extrusion defining extrusion first and second portions, and drawing said extrusion first portion away from said extrusion second portion in a direction substantially perpendicular to said groove with sufficient force to exceed a yield point of material of said extrusion to thereby sever said extrusion first portion from said extrusion second portion.

5. The method of claim 4, wherein said step of drawing said extrusion first and second portions apart includes applying a first clamping means to said upper and lower walls of said extrusion first section and applying a second clamping means to said upper and lower walls of said extrusion second section, rigidly clamping said first clamping means to said extrusion first section and rigidly clamping said second clamping means to the extrusion second section and moving the first and second clamping means relative to each other, in an opposite direction, thereby severing said extrusion first and second sections.

6. The method of claim 5, wherein said step of providing said groove includes scoring surfaces of said upper and lower walls of said extrusion.

7. The method of claim 5, wherein said step of providing said groove includes cutting a groove in said upper and lower walls of said extrusion.

8. The method of claim 7, wherein said cutting step comprises cutting said groove to a depth of approximately 75% to 95% of the thickness of said upper and lower walls.

9. The method of claim 5, wherein the second clamping means is stationary during said moving and said first clamping means is moved in said opposite direction thereby severing said extrusion first and second sections.

10. The method of claim 4, wherein said direction is perpendicular to said groove.

11. The method of claim 10, wherein said step of drawing comprises flexing said extrusion first portion relative to said extrusion second portion.

12. The method of claim 11, wherein said step of drawing said extrusion first and second portions apart includes applying a first clamping means to said upper and lower walls of said extrusion first section and applying a second clamping means to said upper and lower walls of said extrusion second section, rigidly clamping said first clamping means to said extrusion first section and rigidly clamping said second clamping means to the extrusion second section and moving the first and second clamping means relative to each other, in an opposite direction, thereby severing said extrusion first and second sections.

13. The method of claim 12, wherein the second clamping means is stationary during said moving and said first clamping means is moved in said opposite direction thereby severing said extrusion first and second sections.

14. A method of separating a thin-wall multiport extrusion into sections of a micro-tube suitable for use as pass portions in a heat exchanger assembly, said extrusion having an upper wall and a lower wall, said method comprising the steps of:

providing a groove in said upper wall of said extrusion to a depth less than the thickness of said upper wall, providing a groove in said lower wall of said extrusion to a depth less than the thickness of said lower wall of said extrusion, said grooves in said upper and lower walls being aligned and extending transversely of said extrusion defining extrusion first and second portions, applying a clamping means to said upper and lower walls of said extrusion first portion adjacent said grooves in said upper and lower walls, and reciprocating said extrusion second portion in a back and forth motion with sufficient force relative to said clamped first portion to exceed a yield point of material of said extrusion to thereby sever said extrusion first portion from said extrusion second portion.

15. A method of separating an extruded tube member with parallel preformed passages into sections, said tube member having an upper wall and a lower wall, said method comprising the steps of:

providing a groove in said upper wall of said tube member to a depth less than the thickness of said upper wall, providing a groove in said lower wall of said tube member to a depth less than the thickness of said lower wall of said tube member, said grooves in said upper and lower walls being aligned and extending transversely of said extrusion, thereby defining tube member first and second portions, and applying a force to said tube member at a location apart from said grooves, whereby said tube member is severed at said grooves.

16. The method of claim 15, wherein said force applying step further comprises applying a breaking force to at least one of said first and second portions.

17. The method of claim 16, wherein said step of applying a breaking force to at least one of said tube member first and second portions comprises:

applying a first clamp to said upper and lower walls of said tube member first portion and applying a second clamp to said upper and lower walls of said tube member second portion, rigidly clamping said first clamp to said tube member first portion and rigidly clamping said second clamp to said tube member second portion, and moving at least one of said first and second clamps to apply a breaking force at said grooves.

18. The method of claim 15, further comprising feeding said tube member from a continuous roll to a position where said groove providing step is applied and temporarily stopping said feeding for a period sufficient to conduct said groove applying and force applying steps.

19. The method of claim 18, wherein said continuous roll as fed defines an upstream portion from said roll to said groove and a downstream portion from said groove for a predetermined length to an end.

20. The method of claim 15, wherein said groove is made substantially through but without penetrating each of said upper and lower walls.

21. Apparatus for cutting a flat tube into unit pieces, which comprises:
- a tube feeding station for feeding a flat tube with a substantially elliptical cross section having an upper wall, a lower wall, and opposite side walls;
- a pair of disc cutters movable in a direction parallel to said upper and lower walls and transverse to an axial direction of said flat tube, with a cutting depth thereof being adjustable so that cutting grooves are formed and at least said opposite side walls are left uncut;
- a clamp for clamping said flat tube at a point upstream of said cutting grooves; and
- a movable clamp for clamping an end portion of said flat tube at a point downstream of said cutting grooves and flexing said flat tube in a vertical direction so as to break it off, thereby providing a unit piece of said flat tube.

22. Apparatus for use in separating a substantially flat, thin-walled extrusion, having a plurality of passages extending in a longitudinal direction therein into a plurality of sections, the extrusion having an upper wall and a lower wall, said apparatus comprising:
- a first clamping assembly for clamping said extrusion at a first location;
- a second clamping assembly for clamping said extrusion at a second location separated in said longitudinal direction from said first location;
- fault forming means disposed between said first clamping assembly and said second clamping assembly, said fault forming means being operable for movement in a lateral direction substantially orthogonal to said longitudinal direction and for forming a fault in the surface of said upper and lower walls along a first fault line, defining first and second extrusion sections; and
- apparatus for moving one of said first clamping assembly and said second clamping assembly relative to the other said clamping assembly for breaking said extrusion at said fault line to thereby sever said first extrusion section from said second extrusion section.

23. Apparatus according to claim 22 wherein said fault forming means comprises a first cutting means for cutting said upper wall to a depth less than the thickness of said upper wall and a second cutting means for cutting said lower wall to a depth less than the thickness of said lower wall, whereby said first and second cutting means engage said extrusion on opposite sides of said extrusion.

24. Apparatus according to claim 23 wherein at least one of said first and second cutting means comprises a disc cutter having a cutting blade.

25. Apparatus according to claim 23 wherein each of said cutting means is associated with a different one of said clamping assemblies.

26. Apparatus according to claim 23 wherein each of said first and second cutting means comprises a disc cutter having a cutting blade, said blades being disposed in a common plane.

27. Apparatus according to claim 22 wherein said fault forming means comprises a first groove forming means for forming a groove in said upper wall to a depth less than the thickness of said upper wall and a second cutting means for forming a groove in said lower wall to a depth less than the thickness of said lower wall, whereby said first and second groove forming means engage the extrusion on opposite sides of said extrusion.

28. The apparatus of claim 27 wherein said groove is made substantially through but without penetrating each of said upper and lower walls and has a depth T that satisfies the following formula:

$$D<T<B$$

wherein B and D are a height and an inside minor diameter of said flat extrusion so that a part of said upper and lower walls remain uncut, thereby preventing not only production of any cutting burrs but also dust clogging and collapse of said passages.

29. Apparatus according to claim 22 wherein at least one of said first clamping assembly and said second clamping assembly is operative to move said extrusion in at least a first direction.

30. Apparatus according to claim 22 wherein at least one of said first clamping assembly and said second clamping assembly is operative to move said extrusion in at least a first and a second direction.

31. Apparatus according to claim 30 wherein said at least one of said first clamping assembly and said second clamping assembly is operative to move said extrusion in at least two generally opposite directions.

32. The apparatus of claim 22 further comprising means for feeding said extrusion from a continuous roll to a position where said fault forming means is located.

33. The apparatus of claim 32 wherein said continuous roll as fed defines an upstream portion from said roll to said groove and a downstream portion from said groove for a predetermined length to an end.

34. An apparatus for separating an extruded tube member with parallel preformed passages into sections, said tube member having an upper wall and a lower wall, said apparatus comprising:
- means for forming a groove in said upper wall of said tube member to a depth less than the thickness of said upper wall, means for forming a groove in said lower wall of said tube member to a depth less than the thickness of said lower wall of said tube member, said grooves in said upper and lower walls being aligned and extending transversely of said extrusion, thereby defining tube member first and second portions, and
- means for applying a force to said tube member at a location apart from said grooves, whereby said tube member is severed at said grooves.

35. The apparatus for separating a tube member as set forth in claim 34 wherein said means for applying a force is operative to apply a breaking force to at least one of said first and second portions.

36. The apparatus for separating a tube member as set forth in claim 35 further comprising:
- a first clamp for clamping said upper and lower walls of said tube member first portion and a second clamp for clamping said upper and lower walls of said tube member second portion, and means for moving at least one of said first and second clamps to apply a breaking force at said grooves.

37. The apparatus for separating a tube member as set forth in claim 34 further comprising means for feeding said tube member from a continuous roll to a position where said groove forming means are collated and temporarily stopping said feeding for a period sufficient to permit operation of said groove forming means and said force applying means.

38. The apparatus for forming a tube member as set forth in claim 37 wherein said continuous roll as fed defines an upstream portion from said roll to said groove and a downstream portion from said groove for a predetermined length to an end.

39. The apparatus for forming a tube member as set forth in claim 34 wherein said groove is made substantially through but without penetrating each of said upper and lower walls.

40. Apparatus for use in separating a thin-walled multiport extrusion into a plurality of sections of microtube for use in a heat exchanger, the extrusion having an upper wall and a lower wall, said apparatus comprising first clamping means including first and second separable clamping members, second clamping means including third and fourth separable clamping members, first cutting means and second cutting means, said first clamping means being positionable on said upper wall of said extrusion with said first cutting means penetrating said upper wall to a preselected depth along a first cutting line, defining first and second extrusion sections, and said second clamping means being positionable on said lower wall of said extrusion with said second cutting means aligned with said first cutting means and penetrating said lower wall a predetermined depth along a second cutting line which is substantially parallel to said first cutting line, said first and third clamping members defining a first clamping assembly which is rigidly clamped to said first extrusion section, and said second and fourth clamping members defining a second clamping assembly which is rigidly clamped to said second extrusion section, and means for moving said first and second clamping assemblies relative to each other in a direction substantially perpendicular to said cutting lines, thereby pulling said first extrusion section away from said second extrusion section with sufficient force to exceed the yield point of the material of the extrusion to thereby sever said first extrusion section from said second extrusion section.

41. Apparatus according to claim 40 wherein said first cutting means includes a first cutting blade, each of said cutting blades having a tapered edge and a straight edge, the straight edges of the first and second cutting blades being aligned along an axis perpendicular through the extrusion and said cutting blades being oriented with their straight edges extending in opposite directions whereby the first and second cutting blades engage the extrusion on opposite sides of the axis.

42. Apparatus according to claim 41 wherein said tapered edge of each of said cutting blades tapers at an angle.

43. Apparatus according to claim 42 wherein said angle is approximately 45°.

44. Apparatus according to claim 43 wherein each of said cutting blades is not associated with a different one of said clamping assemblies and is not carried by one of the clamping members of the associated clamping assembly.

45. Apparatus according to claim 40 wherein said direction is perpendicular.

46. Apparatus according to claim 45 wherein said first cutting means includes a first cutting blade, each of said cutting blades having a tapered edge and a straight edge, the straight edges of the first and second cutting blades being aligned along an axis perpendicular through the extrusion and said cutting blades being oriented with their straight edges extending in opposite directions whereby the first and second cutting blades engage the extrusion on opposite sides of the axis.

47. Apparatus according to claim 46 wherein said tapered edge of each of said cutting blades tapers at an angle.

48. Apparatus according to claim 46 wherein said angle is approximately 45°.

49. Apparatus according to claim 48 wherein each of said cutting blades is not associated with a different one of said clamping assemblies and is not carried by one of the clamping members of the associated clamping assembly.

50. Apparatus according to claim 40 wherein said relative moving is a flexing movement.

51. Apparatus according to claim 50 wherein said first cutting means includes a first cutting blade, each of said cutting blades having a tapered edge and a straight edge, the straight edges of the first and second cutting blades being aligned along an axis perpendicular through the extrusion and said cutting blades being oriented with their straight edges extending in opposite directions whereby the first and second cutting blades engage the extrusion on opposite sides of the axis.

52. Apparatus according to claim 51 wherein said tapered edge of each of said cutting blades tapers at an angle.

53. Apparatus according to claim 52 wherein said angle is approximately 45°.

54. Apparatus according to claim 53 wherein each of said cutting blades is not associated with a different one of said clamping assemblies and is not carried by one of the clamping members of the associated clamping assembly.

55. The apparatus according to claim 40, wherein said second clamping assembly is stationary during said moving and said first clamping assembly is moved in said opposite direction, thereby severing said extrusion first and second sections.

56. An apparatus for separating a thin-walled, multiport extrusion into sections of a micro-tube suitable for use as pass portions in a heat exchanger assembly, the extrusion having an upper wall and a lower wall, said apparatus comprising:
  means for providing a groove in the upper wall of the extrusion to a depth less than the thickness of the upper wall and for providing a groove in the lower wall of the extrusion to a depth less than the thickness of the lower wall of the extrusion, the grooves in the upper and lower walls being aligned and extending transversely of the extrusion defining extrusion first and second portions, and
  means for drawing the extrusion first portion away from the extrusion second portion in a direction perpendicular to the groove with sufficient force to exceed the yield point of the material of the extrusion to thereby sever the extrusion first portion from the extrusion second portion.

57. The apparatus according to claim 56, wherein said means for drawing the extrusion first and second portions apart includes a first clamping means applying a force to the upper and lower walls of the extrusion first section and a second clamping means applying a force to the upper and lower walls of the extrusion second section, the first clamping means rigidly clamping to the extrusion first section and the second clamping means rigidly clamping to the extrusion second section and means for moving the first and second clamping means relative to each other, in an opposite direction, thereby severing the extrusion first and second sections.

58. The apparatus according to claim 57, wherein said means for providing the groove is operative to score the surfaces of the upper and lower walls of the extrusion.

59. The apparatus according to claim 57, wherein said means for providing the groove is operative to cut a groove in the upper and lower walls of the extrusion.

60. The apparatus according to claim 57, wherein said second clamping means is stationary during said moving and said first clamping means is moved in said opposite direction, thereby severing said extrusion first and second sections.

* * * * *